United States Patent
Gao et al.

(10) Patent No.: US 11,210,291 B2
(45) Date of Patent: Dec. 28, 2021

(54) DIFFERENTIAL INDEXING FOR FAST DATABASE SEARCH

(71) Applicant: Microsoft Technology Licensing, LLC, Redmond, WA (US)

(72) Inventors: Shan Gao, Guangdong (CN); Choong Soon Chang, Palo Alto, CA (US); Yuan Xu, San Jose, CA (US); Muwu Hou, San Jose, CA (US); Hongbin Wu, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 16/871,843

(22) Filed: May 11, 2020

(65) Prior Publication Data

US 2021/0349904 A1    Nov. 11, 2021

(51) Int. Cl.
*G06F 16/2453* (2019.01)
*G06F 16/248* (2019.01)
*G06F 16/22* (2019.01)

(52) U.S. Cl.
CPC .... *G06F 16/24549* (2019.01); *G06F 16/2228* (2019.01); *G06F 16/248* (2019.01)

(58) Field of Classification Search
CPC ........... G06F 16/24549; G06F 16/2228; G06F 16/248
USPC ........................................................ 707/715
See application file for complete search history.

(56) References Cited

U.S. PATENT DOCUMENTS

| | | | | |
|---|---|---|---|---|
| 2012/0042279 | A1* | 2/2012 | Naderi | G06F 3/04855 715/786 |
| 2013/0232152 | A1* | 9/2013 | Dhuse | G06F 16/2228 707/741 |
| 2015/0254263 | A1* | 9/2015 | Dong | G06F 16/248 707/722 |
| 2016/0170834 | A1* | 6/2016 | Erickson | G06F 16/2228 707/649 |
| 2018/0285458 | A1* | 10/2018 | Khalkechev | G06F 16/248 |
| 2018/0307763 | A1* | 10/2018 | Hersans | H04L 9/3242 |

\* cited by examiner

*Primary Examiner* — Dung K Chau
(74) *Attorney, Agent, or Firm* — Schwegman Lundberg & Woessner, P.A.

(57) ABSTRACT

Methods, systems, and computer programs are presented for improving search speed and quality using differential indexing. One method includes an operation for building a first index for a database, the first index being for first tokens resulting from normalizing words in input data. Further, the method includes building a second index for the database, the second index being for second tokens comprising words of the input data eliminated from the first index during the normalizing. The method further includes operations for receiving a raw query for a search of the database, and for generating a search query based on tokens of the raw query. The search query comprises a combined search of the first index and the second index. A search is performed based on the search query, and results of the search are returned for presentation on a display.

20 Claims, 12 Drawing Sheets

DIFFERENTIAL INDEXING - ADDITIONS

DIFFERENTIAL INDEXING FOR FAST DATABASE SEARCH

TECHNICAL FIELD

The subject matter disclosed herein generally relates to methods, systems, and machine-readable storage media for improving the quality and speed of database searches.

BACKGROUND

Indexing data stored in databases makes search operations faster because the database does not have to search all the content it stores. Particularly, many databases that store textual content will index the words in the content being stored. Therefore, when a text search takes place, the search results can be provided quickly and accurately.

However, sometimes problems may arise in special cases, such as a user having a name that is hyphenated by combining two words. Typically, the database will separate the two words so that fact that the name is hyphenated is lost. Thus, when a user performs a search for the hyphenated name, the database may generate search results associated with each of the two words, which makes difficult to accurately rank the search results.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to improving search speed and quality using differential indexing. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A database system provides a framework for indexing the same text in multiple ways. During search, the multiple indexes provide different scoring signals to balance recall and precision. However, supporting multiple indexes means increased cost. To lower the cost of supporting multiple indexes, the indexes are synchronized to reduce duplication across the indexes and lower overhead. The result is improved search scoring and ranking while reducing use of computer resources.

One general aspect includes a method that includes an operation for building a first index for a database, the first index being for first tokens resulting from normalizing words in input data. Further, the method includes building a second index for the database, the second index being for second tokens comprising words of the input data eliminated from the first index during the normalizing. The method further includes operations for receiving a raw query for a search of the database, and for generating a search query based on tokens of the raw query. The search query comprises a combined search of the first index and the second index. A search is performed based on the search query, and results of the search are returned for presentation on a display.

Figure 1:
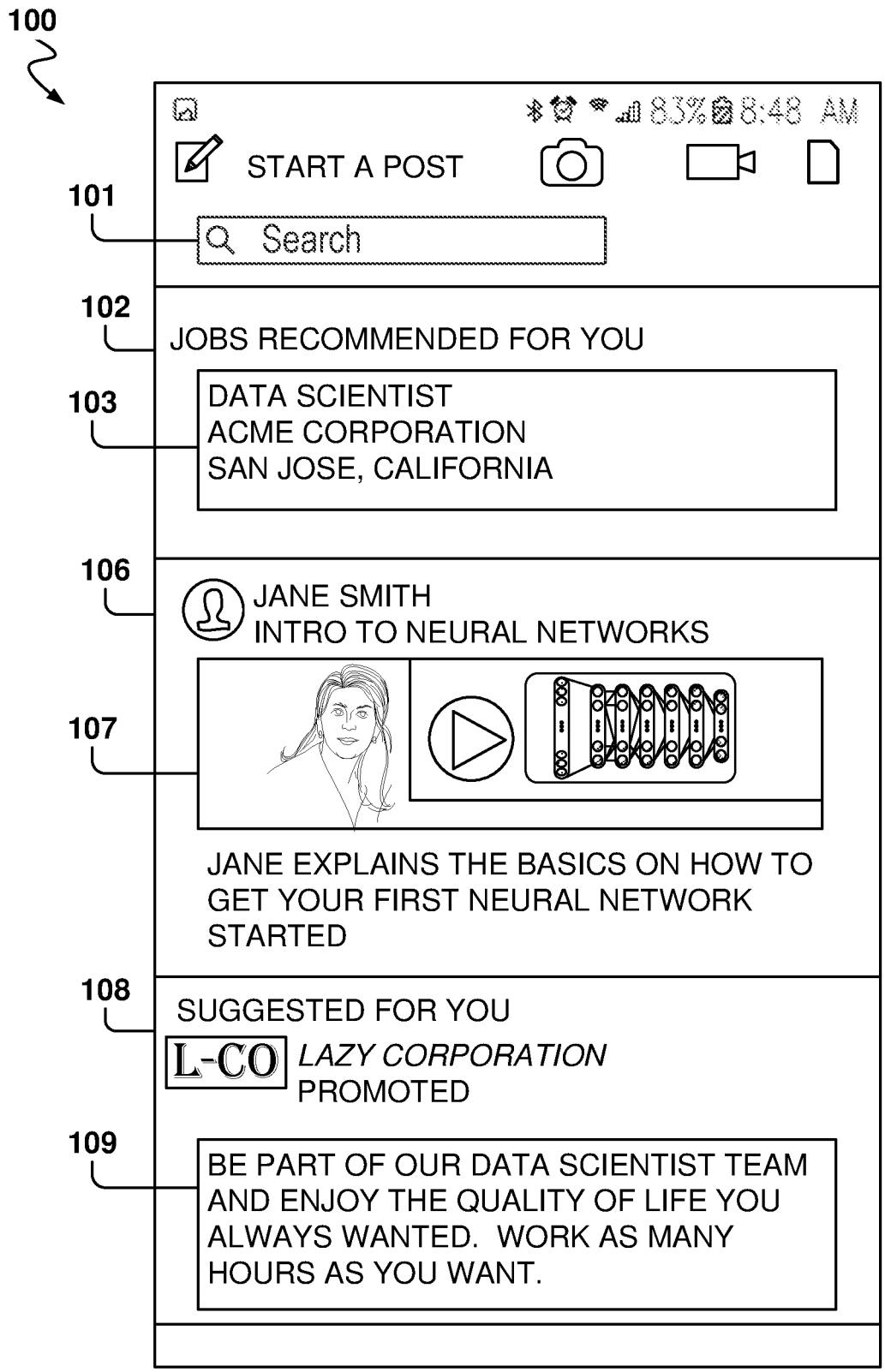
FIG. 1 is a screenshot of a user feed, according to some example embodiments.

FIG. 1 is a screenshot of a user feed 100 that includes items in different categories, according to some example embodiments. In the example embodiment of FIG. 1, the user feed 100 includes different categories, such as job recommendations 102, user posts 106, and sponsored items 108; other embodiments may include additional categories such as news, messages, articles, etc.

The user posts 106 include item 107 posted by users of the social network service (e.g., items posted by connections of the user), and may be videos, comments made on the social network, pointers to interesting articles or webpages, etc. In the illustrated example, the item 107 includes a video submitted by a user.

In one example embodiment, a social network service user interface provides the job recommendations 102 (e.g., job posts 103 and 109) that match the job interests of the user and that are presented without a specific job search request from the user, referred to herein as "jobs you may be interested in" (JYMBII). In other example embodiments, the user feed 100 includes suggestions or recommendations (not shown in FIG. 1) for adding new connections, a feature referred to herein as People You May Know (PYMK).

Although the categories are shown as separated within the user feed 100, the items from the different categories may be intermixed, and not just presented as a block. Thus, the user feed 100 may include a large number of items from each of the categories, and the social network decides the order in which these items are presented to the user based on the desired utilities. Additionally, the user may receive in-network communications from other users. The communications may originate by other users who are socially connected with the user or by unconnected users.

Embodiments presented described methods for improving searches. Some embodiments are presented with reference to searching for users on the social network service, but the same principles may be used for any type of search, such as PYMK, job search, JYMBII, user posts, news, etc.

Figure 2:
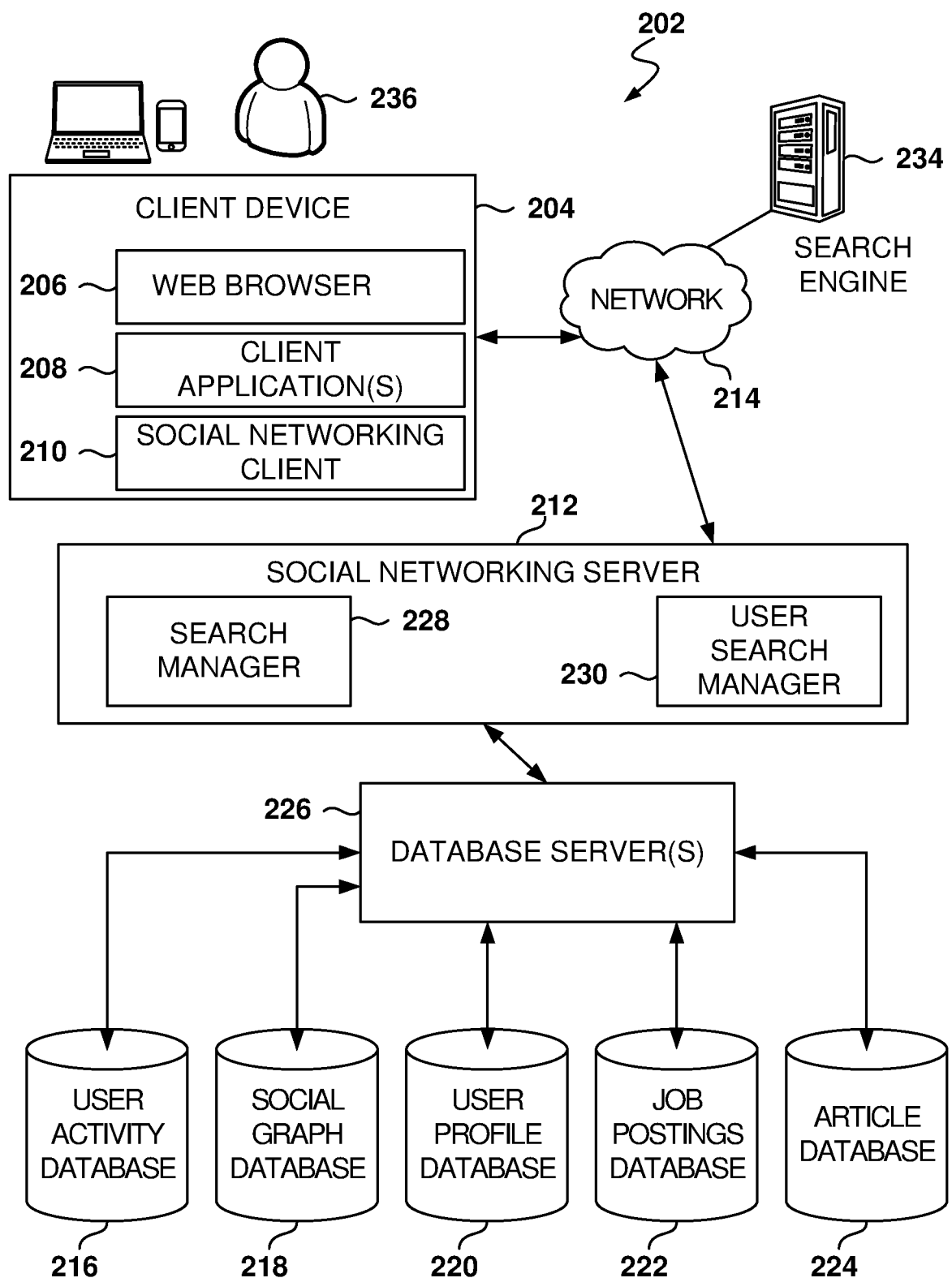
FIG. 2 is a block diagram illustrating a networked system, according to some example embodiments, including a social networking server, illustrating an example embodiment of a high-level client-server-based network architecture.

FIG. 2 is a block diagram illustrating a networked system, according to some example embodiments, including a social networking server 212, illustrating an example embodiment of a high-level client-server-based network architecture 202. Embodiments are presented with reference to an online service and, in some example embodiments, the online service is a social networking service.

The social networking server 212 provides server-side functionality via a network 214 (e.g., the Internet or a wide area network (WAN)) to one or more client devices 204. FIG. 2 illustrates, for example, a web browser 206, client application(s) 208, and a social networking client 210 executing on a client device 204. The social networking server 212 is further communicatively coupled with one or more database servers 226 that provide access to one or more databases 216-724.

The social networking server 212 includes, among other modules, a search manager 228 and a user search manager 230. The search manager 228 performs search operations in the social networking service and includes modules for different types of searches, such as user search manager 230 that performs searches for users in the social network service.

The client device 204 may comprise, but is not limited to, a mobile phone, a desktop computer, a laptop, a tablet, a netbook, a multi-processor system, a microprocessor-based or programmable consumer electronic system, or any other communication device that a user 236 may utilize to access the social networking server 212. In some embodiments, the client device 204 may comprise a display module (not shown) to display information (e.g., in the form of user interfaces).

In one embodiment, the social networking server 212 is a network-based appliance that responds to initialization requests or search queries from the client device 204. One or more users 236 may be a person, a machine, or other means of interacting with the client device 204. In various embodiments, the user 236 interacts with the network architecture 202 via the client device 204 or another means.

The client device 204 may include one or more applications (also referred to as "apps") such as, but not limited to, the web browser 206, the social networking client 210, and other client applications 208, such as a messaging application, an electronic mail (email) application, a news application, and the like. In some embodiments, if the social networking client 210 is present in the client device 204, then the social networking client 210 is configured to locally provide the user interface for the application and to communicate with the social networking server 212, on an as-needed basis, for data and/or processing capabilities not locally available (e.g., to access a user profile, to authenticate a user 236, to identify or locate other connected users 236, etc.). Conversely, if the social networking client 210 is not included in the client device 204, the client device 204 may use the web browser 206 to access the social networking server 212.

In addition to the client device 204, the social networking server 212 communicates with the one or more database servers 226 and databases 216-724. In one example embodiment, the social networking server 212 is communicatively coupled to a user activity database 216, a social graph database 218, a user profile database 220, a job postings database 222, and an article database 224. The databases 216-724 may be implemented as one or more types of databases including, but not limited to, a hierarchical database, a relational database, an object-oriented database, one or more flat files, or combinations thereof.

The user profile database 220 stores user profile information about users 236 who have registered with the social networking server 212. With regard to the user profile database 220, the user 236 may be an individual person or an organization, such as a company, a corporation, a non-profit organization, an educational institution, or other such organizations.

In some example embodiments, when a user 236 initially registers to become a user 236 of the social networking service provided by the social networking server 212, the user 236 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 220. Similarly, when a representative of an organization initially registers the organization with the social networking service provided by the social networking server 212, the representative may be prompted to provide certain information about the organization, such as a company industry.

As users 236 interact with the social networking service provided by the social networking server 212, the social networking server 212 is configured to monitor these interactions. Examples of interactions include, but are not limited to, commenting on posts entered by other users 236, viewing user profiles, editing or viewing a user 236's own profile, sharing content outside of the social networking service (e.g., an article provided by an entity other than the social networking server 212), updating a current status, posting content for other users 236 to view and comment on, posting job suggestions for the users 236, searching job postings, and other such interactions. In one embodiment, records of these interactions are stored in the user activity database 216, which associates interactions made by a user 236 with his or her user profile stored in the user profile database 220.

The job postings database 222 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database server(s) 226 are illustrated as a single block, one of ordinary skill in the art will recognize that the database server(s) 226 may include one or more such servers. Accordingly, and in one embodiment, the database server(s) 226 implemented by the social networking service are further configured to communicate with the social networking server 212.

The network architecture 202 may also include a search engine 234. Although only one search engine 234 is depicted, the network architecture 202 may include multiple search engines 234. Thus, the social networking server 212 may retrieve search results (and, potentially, other data) from multiple search engines 234. The search engine 234 may be a third-party search engine.

Figure 3:
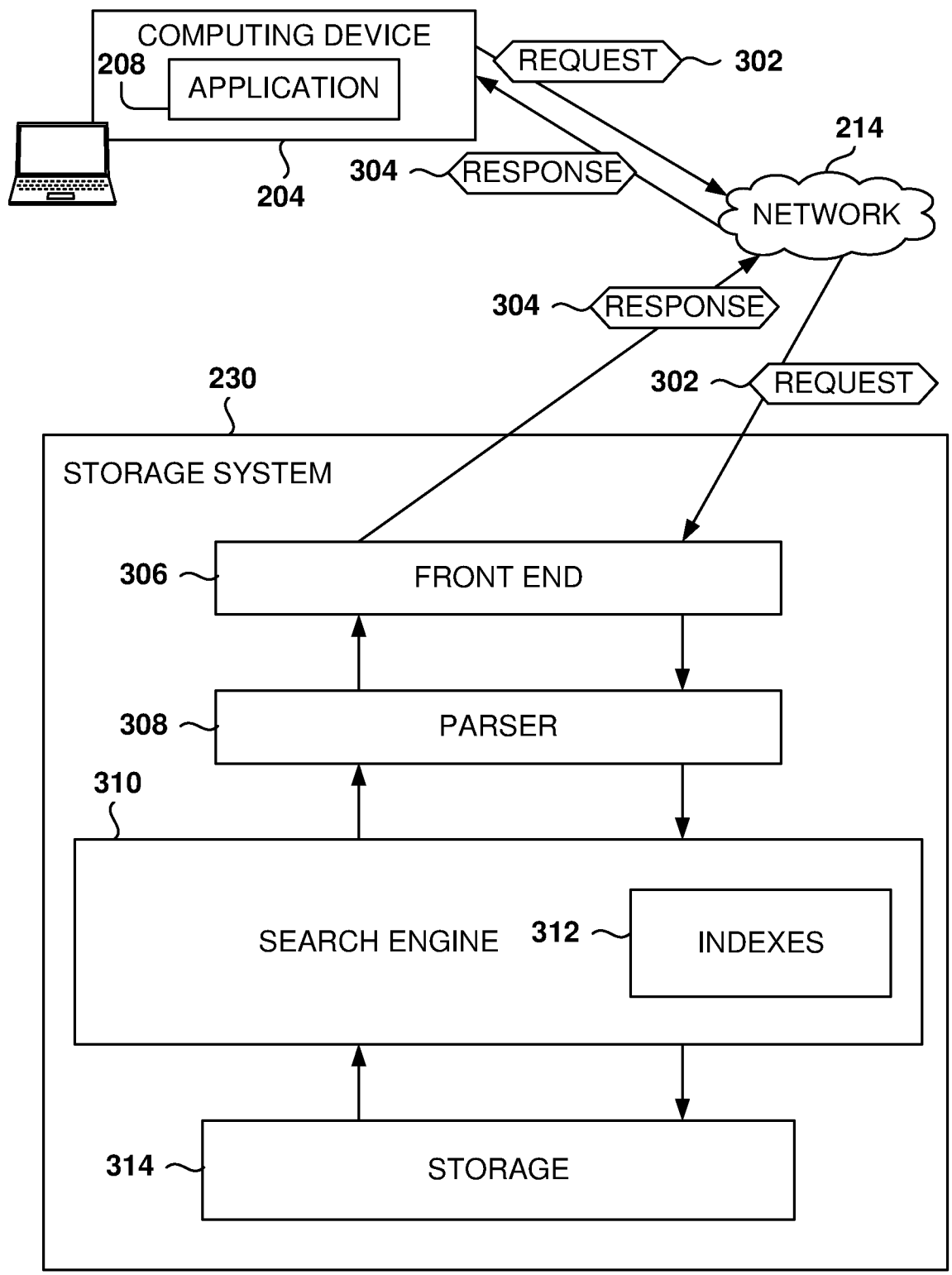
FIG. 3 illustrates the processing of a request by the storage system, according to some example embodiments.

FIG. 3 illustrates the processing of a request by the storage system, according to some example embodiments. Cloud storage systems distribute processing of large data sets across clusters of computers using simple programming models. The cloud storage systems is designed to scale up from single servers to thousands of machines or more, each offering local computation and storage.

FIG. 3 illustrates the processing of a user request (e.g., a name search). The storage system 202 provides a front end 306, which includes a set of operations to access files in storage 314.

In the illustrated example, an application 208 in computing device 204 sends a request 302 to the storage system 230 via network 214. The front end 306 passes the request 302 to the parser 308, which may also perform some operations on the request, such as making all text lowercase, eliminating filler words, or breaking the request into multiple words.

After the parsing, the request is sent to the search engine 310, which interacts with storage 314 to search for the data, rank the results, and prioritize the results based on the ranking. The search engine 312 includes one or more indexes for the data in storage 314.

The search engine 310 generates the response 304, which includes a prioritized list of matching results with zero or more results, and the storage system 230 sends the response 304 to the computing device 204 via the network 214.

In some example embodiments, the data in storage 314 is stored in documents (e.g., a document for a user profile), and the document includes the information that can be searched (e.g., user name). Therefore, when performing a search, it is not known which documents need to be accessed, so the content of the documents has to be searched.

A database index 312 is a data structure that improves the speed of data retrieval operations on a database at the cost of additional writes and storage space to maintain the index data structure. Indexes 312 are used to quickly locate data without having to search every document in a database every time the database is accessed. Indexes 312 can be created using one or more fields of a database, providing the basis for both rapid random lookups and efficient access of ordered records. For example, an index may include a mapping of one word to the documents in the database that contain that term.

In some example embodiments, the content of a text document is tokenized, which means identifying the words in the text document, transforming the words to a common format (e.g., lowercase), normalizing similar words into a same token (e.g., Joseph or Joe), and eliminating filler words (e.g., "a"). In some example embodiments, normalizing includes lowercasing the input stream, eliminating filler words, separating hyphenated words in the input stream into separate words, and making each word of the input stream one of the tokens. In some example embodiments, a filler word is a word that is not part of the name, and is not a verb, a noun, or an adjective. For example, articles and prepositions are filler words. In other example embodiments, other criteria may be defined for filler words.

Figure 4:
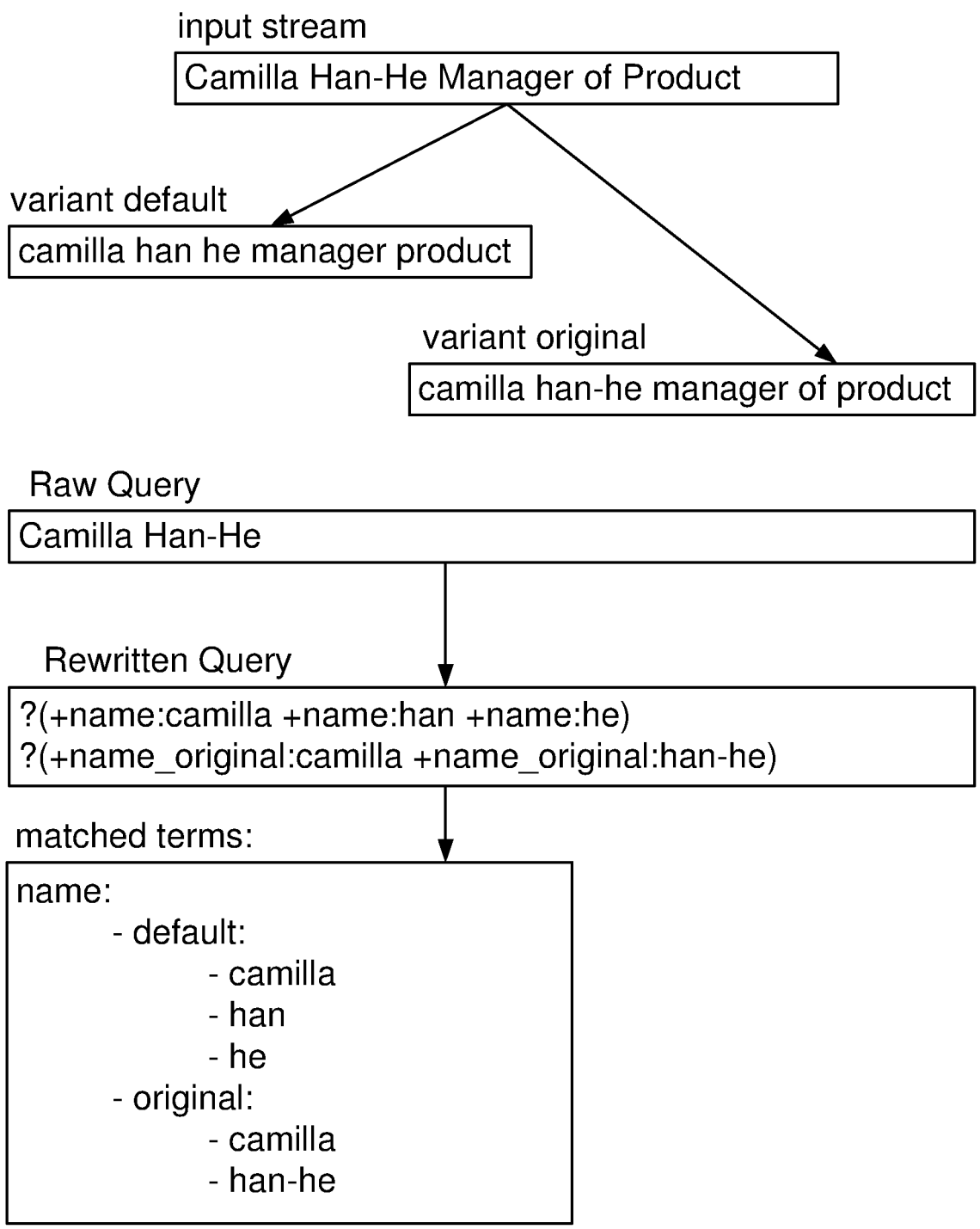
FIG. 4 illustrates the creation of tokens for a search query, according to some example embodiments.

FIG. 4 illustrates the creation of tokens for a search query, according to some example embodiments. Here are some definitions for terms used herein:

"Input stream", is the raw input to be stored in the database.

"Default token," also referred to herein simply as token, is a word in a standard format (e.g., normalized). For example, a name may be listed as Michael, Michel, Mikey, Micky, etc., and the token for all these names is unique, such as Michael.

"Variant" is a list of tokens derived from the input stream.

"Variant default" is the list of tokens resulting from tokenizing the input stream.

"Default analyzer" is the analyzer that creates the variant default based on the input stream.

"Variant analyzer" is the analyzer that creates one or more variants based on the input stream.

Normalized text is a text string resulting from converting text to a common format (e.g., reduced to lowercase, use of standard terms). The normalized text may include hyphenated words and filler words.

Tokenized text is a text string resulting from converting text to tokens (e.g., reduced to lowercase, use of standard terms, separate hyphenated words, elimination of filler words). The tokenized text does not include hyphenated words and filler words.

There may be different analyzers that examine a list of tokens to generate another list of tokens meeting some criteria. The analyzers perform linguistic analysis, such as converting to lowercase, normalizing, creating synonyms and splitting one term into multiple terms (e.g., hyphenated words).

In some example embodiments, a multi-analyzer text-Field, which has one named variant, is defined as follows:
<textField name="firstName" analyzerRef="MemberAnalyzer"
  hasPositions="true">
  <variant name="original" analyzerRef=
  "TermPreserveAnalyzer"/>
</textField>

MemberAnalyzer generates the variant default and TermPreserveAnalyzer generates the variant original. In the example illustrated in FIG. 4, the input stream is "Camilla Han-He Manager of Product." The input stream may be generated, for example, when a user enters information for her user profile. The user profile includes data about the user, such as name, title, experience, skills, etc.

The variant default is the result of tokenizing the terms in the input stream, which in this example is "camilla han he manager product." The variant default does not include hyphenated words and filler words. The variant original includes the normalized words from the input stream, which in this example is, "camilla han-he manager of product." Thus, the variant original may include hyphenated words. For the variant default, the hyphenated "Han-He" has been split into two different tokens and the word "of" has not been included.

There are be some drawbacks when doing searches just using the variant default. For example, a search for "Han-He" would not be able to detect which names include "Han-He" instead of just "Han," "He," or both as separate names.

When a user enters a raw query, a transformed query is generated to take advantage of both indexes. This transformed query is referred to herein as the rewritten query. In some example embodiments, the rewritten query is formed by tokenizing and normalizing the raw query and then perform a search of the tokens in the variant default and a search of the normalized words of the raw query in the variant original. In this example, the raw query is "Camilla Han-He," and the rewritten query is as follows:
?(+name:camilla+name:han+name:he) ?(+name_original: camilla +name_original:han-he)

Here, +name: is a search using the variant default, and +name_original: is a search using the variant original. This means that the tokens "camilla," "han," and "he" are searched in the variant default because these are the tokens in the raw query. Further, the words of the raw query are searched in the variant original. In this case, the word "Han-He" is part of the raw query as a hyphenated word, then the rewritten query checks the condition that "han-he" must be part of the variant original. This way someone named "Han He" would not be included in the results.

In this example, the matched terms are:
default: camilla, han, he
original: camilla, han-he The more indexing performed on the data, the better the ranking scores of the results will be. However, the index size increases linearly with the number of variants defined. When the variant default and variant original are indexed, then it is quick to find the exact match, but the size of the index is big because some words are duplicated in both indexes. This indexing about doubles in size when compared to just storing one of the indexes.

Figure 5:
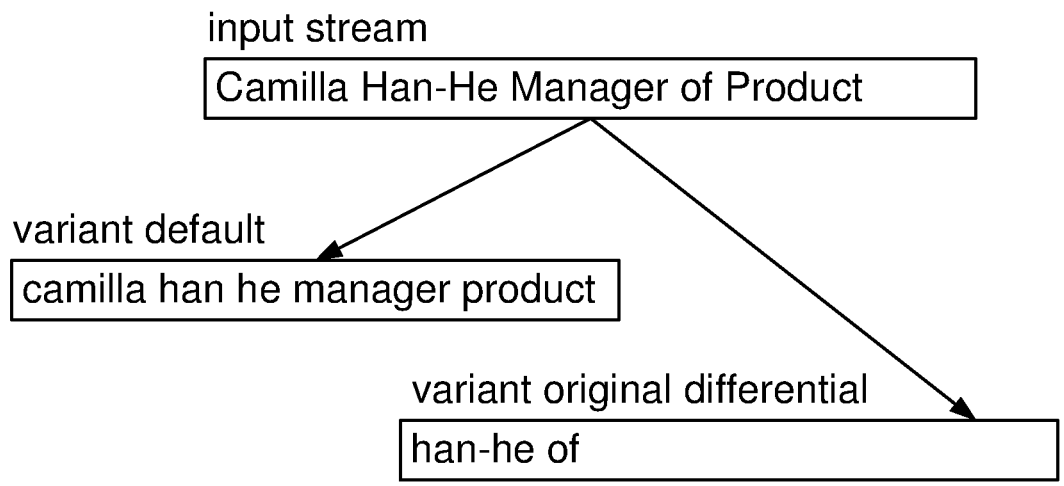
FIG. 5 shows differential indexing, according to some example embodiments.
Figure 5:
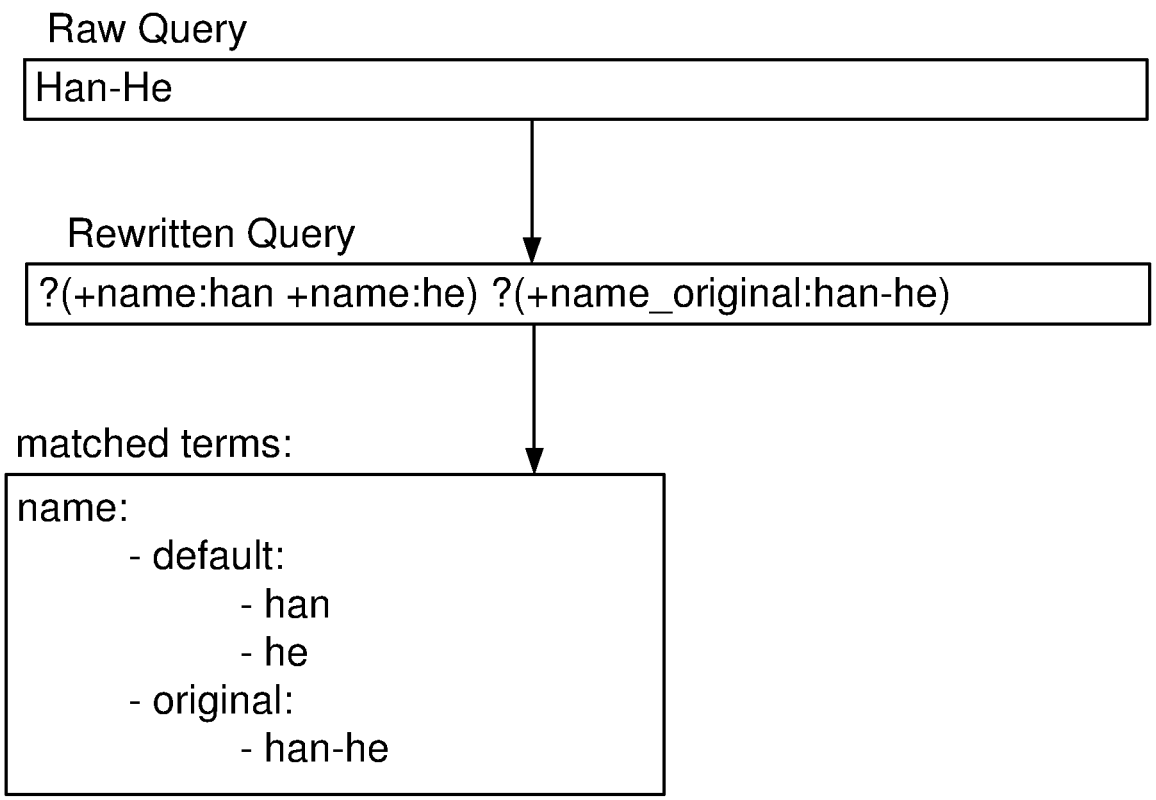

FIG. 5 shows differential indexing, according to some example embodiments. Differential indexing involves indexing the difference between the variant original and the variant default so duplicate terms do not have to be in both indexes. By storing the variant original differential instead of the variant original, duplicates are removed, and the size of the index is reduced. This results in the reduction of the amount of space required for indexing (e.g., in the range from 50% to 99% depending on the input data).

A first type of differential indexing includes creating the variant original differential with the normalized words that are in the normalized input stream but not as tokens in the variant original. In this example, the variant original differential is "han-he of" because "han-he" and "of" are words in the normalized input stream but not present in the variant default.

The idea behind this approach is that the users usually want exact matches and the variant original differential supplies this information. Usually, there is no need to modify the search logic that is based in simply searching the variant default.

With differential indexing, the rewritten search is to search for the tokens of the raw query in the variant default and search for the words of the raw query in the variant original differential. For example, the user enters a raw query of "Han-He," then the rewritten query is:

?(+name:han+name:he) ?(+name_original:han-he)

Here, "?" means that a clause is optional. When having two or more "?" clauses, there is an implicit Boolean OR operator. Further, "+" means that a clause is required, and when having two or more "+" clauses, there is an implicit Boolean AND operator. Further, +name: is a search on the variant default, and +name_original: is a search on the variant original differential. Thus, the expression "+name:han+name:he" means searching "han" in the variant default and searching "he" in the variant default. Additionally, a "−" clause associated with a term, as shown below, means that it is an excluded clause and the term associated with the "−" clause cannot be present in a document to be considered a match for the query.

Thus, the rewritten query will search for "han" and "he" in the variant default and for "han-he" in the variant original differential because this word would not be found in the variant default.

The matched terms are then:
default: han, he
original: han-he

Figure 6:
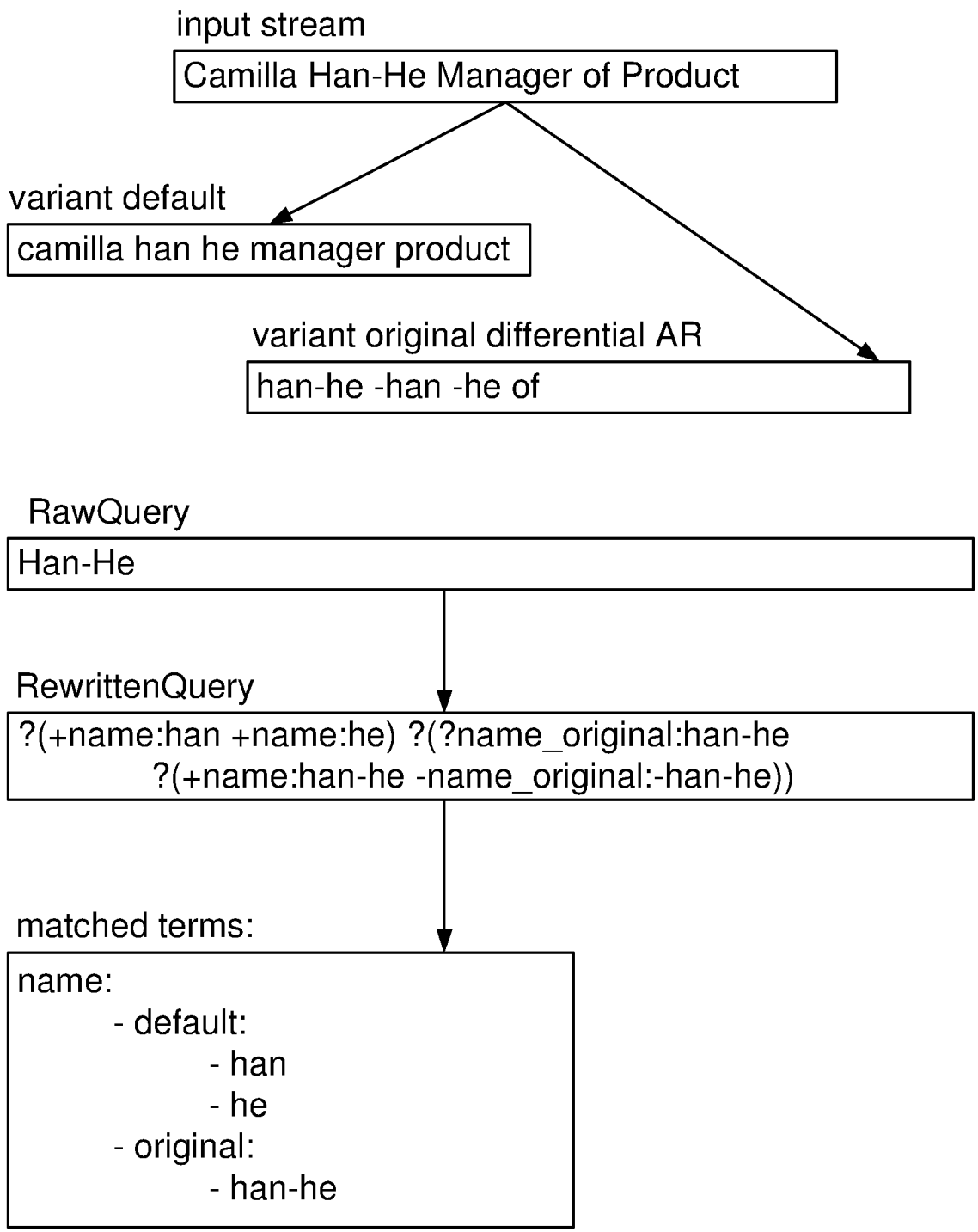
FIG. 6 shows differential indexing with additions and removals, according to some example embodiments.

FIG. 6 shows differential indexing with additions and removals, according to some example embodiments. A second type of differential indexing is variant original differential AR (Additions & Removals). The variant original differential AR includes additions, which are the words that are in the normalized input stream but not in the variant default, and removals (represented by a prefix '−'), which are the tokens in the variant default that are not words in the normalized input stream.

In this example, the variant original differential AR is "han-he -han -he of" because "han-he" and "of" were in the tokenized input stream but not in the variant original, and because "han" and "he" are the tokens in the variant default but not in the original input stream, that is, these tokens are excluded from the variant default.

In this case, the rewritten query is to search for the tokens of the search query in the variant default plus either one of:
an addition of the search word in the variant original differential AR or
the search word in the variant default and no removal (e.g., no exclusion) of the word search in the variant original differential AR.

In the illustrated example, if the user enters the raw query of a word "Han-He," the rewritten query is as follows:

?(+name:han+name:he) ?(?name_original:han-he ?(+name:han-he −name_original:-han-he))

Here, +name: is a search on the variant default, and +name_original: is a search on the variant original differential AR.

In our case, tokens "han" and "he" are in the variant default and the word "han-he" is in the variant original differential AR. Note that "han-he" would not be in the variant default because the variant default does not include hyphenated words.

This rewritten query facilitates the search for a user that wants to search for names with "Han-He" but not with "Han" and "He" as independent tokens.

Figure 7:
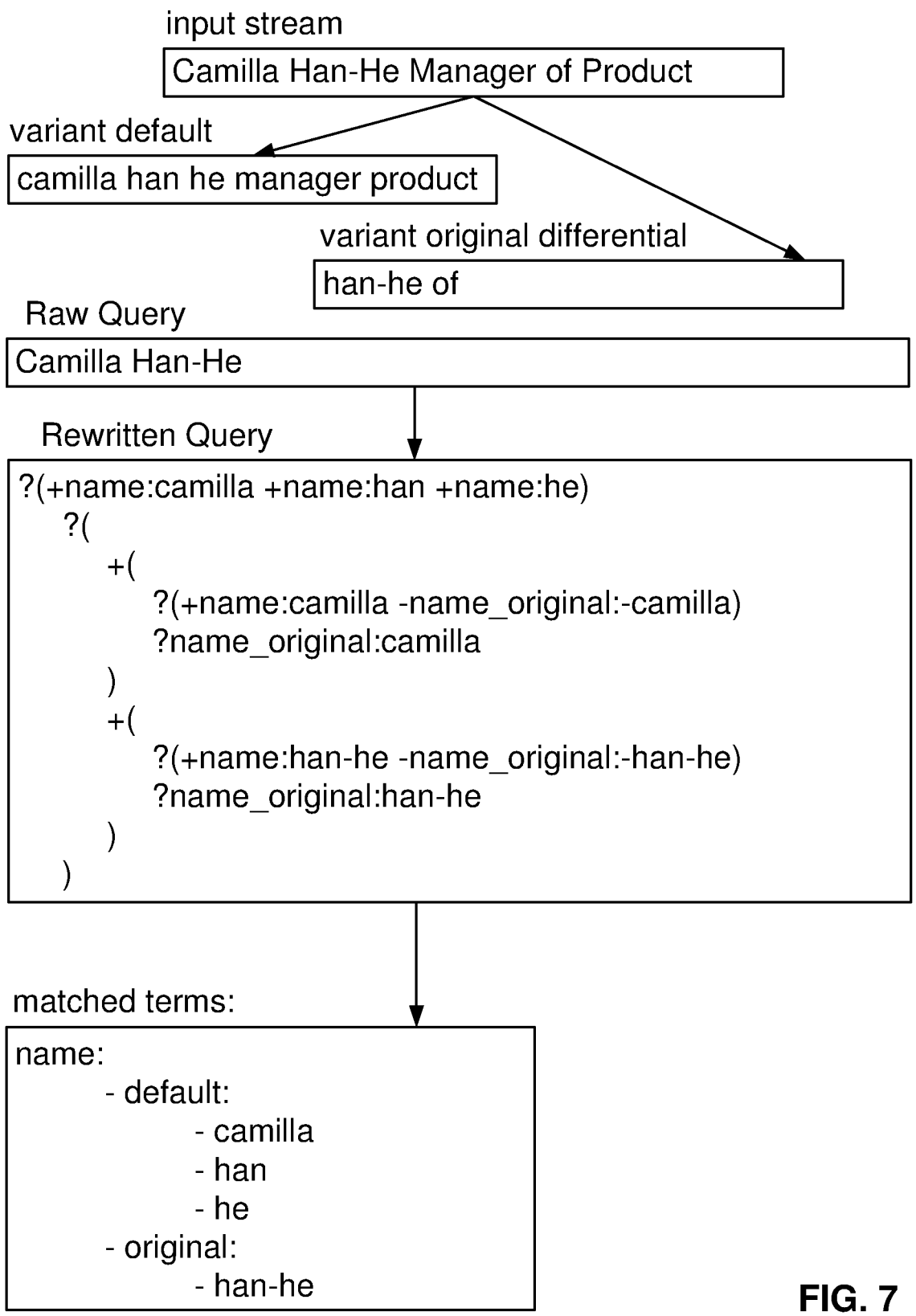
FIG. 7 shows how to rewrite the search query with differential indexing, according to some example embodiments.

FIG. 7 shows how to rewrite the search query with differential indexing, according to some example embodiments. In this example, the raw query is "Camilla Han-He." Without differential indexing, the rewritten query would be "?(+name:camilla+name:han+name:he) ?(+name_original:camilla +name_original:han-he)." This means find the tokens in the raw query "camilla," "han" and "he," and find the two words in the raw query in the variant original. The matched terms are:
default: camilla, han, he
original: camilla, han-he However, with differential indexing, this query does not work anymore, since "camilla" is no longer indexed in the variant original differential. However, to construct a clause that is equivalent to "name_original:xxx," where "xxx" is the word searched, a search is made for token "xxx" in the variant original differential as an addition, or a search for token "xxx" in the variant default and no removal in the variant original differential.

The search for "camilla" is rewritten as:
?(+name:camilla −name_original:-camilla)
?name_original:camilla Similarly, the search for "han-he" is rewritten as:
?(+name:han-he −name_original:-han-he)
?name_original:han-he Therefore, the raw query "Camilla Han-He" is rewritten as follows:
?(+name:camilla+name:han+name:he)
?(
  +(
    ?(name:camilla −name_original:-camilla)
    ?name_original:camilla
  )
  +(
    ?(+name:han-he −name_original:-han-he)
    ?name_original:han-he
  )
)

This query works for retrieval, but there may be negative effects on result scoring, since matched terms may be corrupted. For example, the matched terms of a document named "camilla han-he" would be:

default: camilla, han, he
original: han-he

In this case, "camilla" is missing from the variant original differential. The reason is that the searcher application is not aware of that the complete Boolean clause, "?(+name: camilla –name_original:-camilla) ? name_original:camilla," is used to represent "name_original:camilla." To correct this, the searcher is informed that the Boolean clause, "?(+name: camilla -name_original:-camilla) ?name_original:camilla" is equivalent to "name_original:camilla" and that if there is a whole clause match, "camilla" should be added to the "name_original" field.

Figure 8:
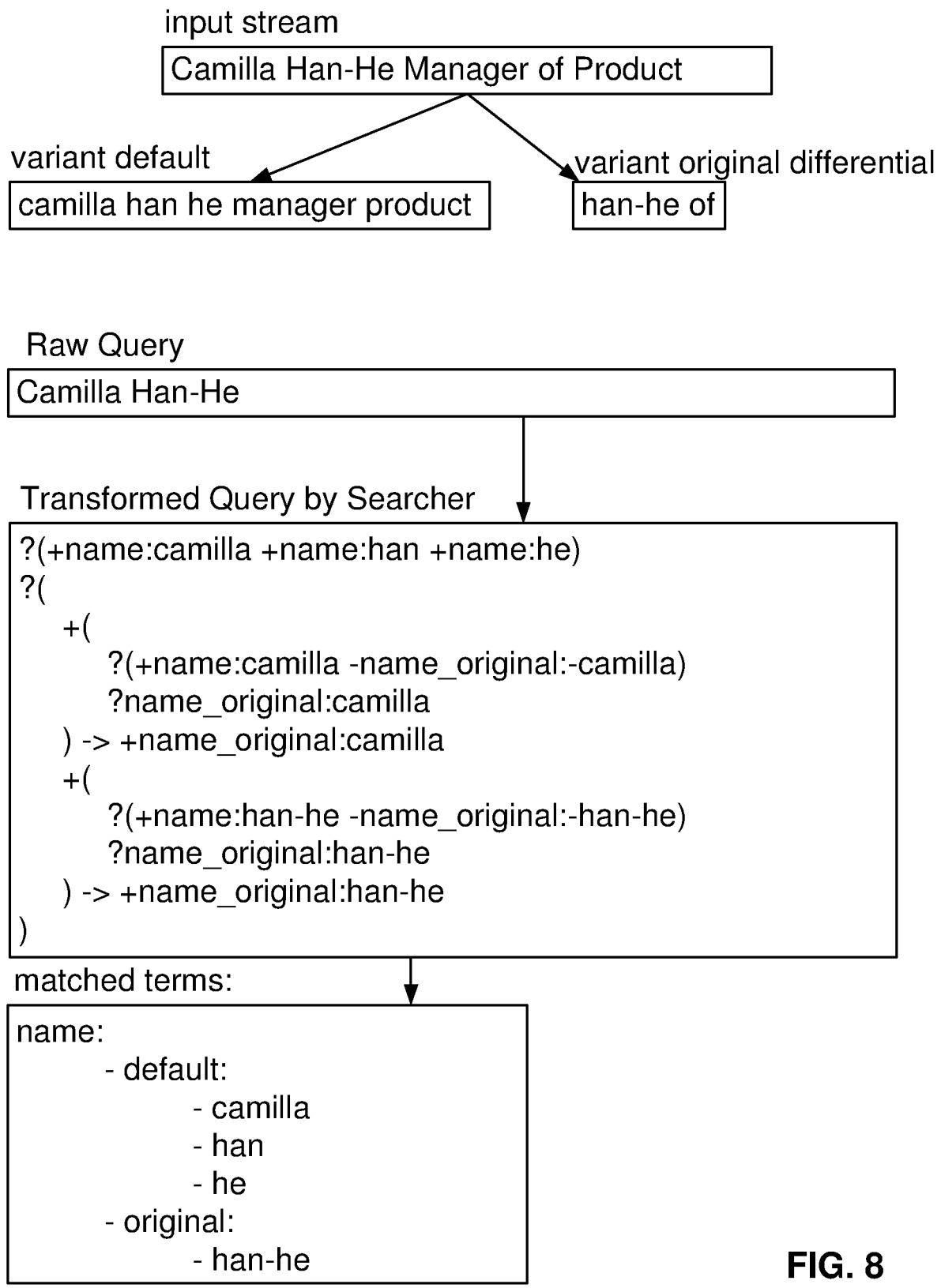
FIG. 8 shows how to rewrite the search query with indexing and transformation, according to some example embodiments.

FIG. 8 shows how to rewrite the search query with indexing and transformation, according to some example embodiments. To correct the problem identified above, instead of rewriting the raw query to ""name_original:xxx" to "?(+name:xxx –name_original:-xxx) ?name_original: xxx," the searcher application does a transformation for the rewritten query.

Since the searcher is aware of the index schema, whenever the searcher meets a query term when using variant original differential, the query is transformed accordingly. In the illustrated example, the raw query "Camilla Han-He" is transformed to the following:

?(+name:camilla+name:han+name:he)
  ?(
    +(
      ?(+name:camilla –name_original:-camilla)
      ?name_original:camilla
    ) ->+name_original:camilla
    +(
      ?(+name:han-he –name_original:-han-he)
      ?name_original:han-he
    ) ->+name_original:han-he
  )

As discussed above, to support differential indexing, the variant original differential AR analyzer differentiates its output tokens from the output of default analyzer, and notify the indexing pipeline and the rewriter if the token is an addition or a removal.

In some example embodiments, during parsing, the variant original differential analyzer outputs tokens with an additional type attribute indicating if it is an addition or a removal.

In some example embodiments, several text-processing modules are provided, including a member analyzer, a term-preserve analyzer, and a differential analyzer. The member analyzer tokenizes the input stream. The term-preserve analyzer provides all the tokens in the input stream without deletions. The differential analyzer indicates which words have been added or removed in the variant original differential.

For example:
Input stream: Camilla Han-He Manager of Product
Member analyzer: camilla han he manager product
Term preserve analyzer: camilla han-he manager of product
Differential analyzer: han-he(addition) han(removal) he(removal) of(addition)

Figure 9:
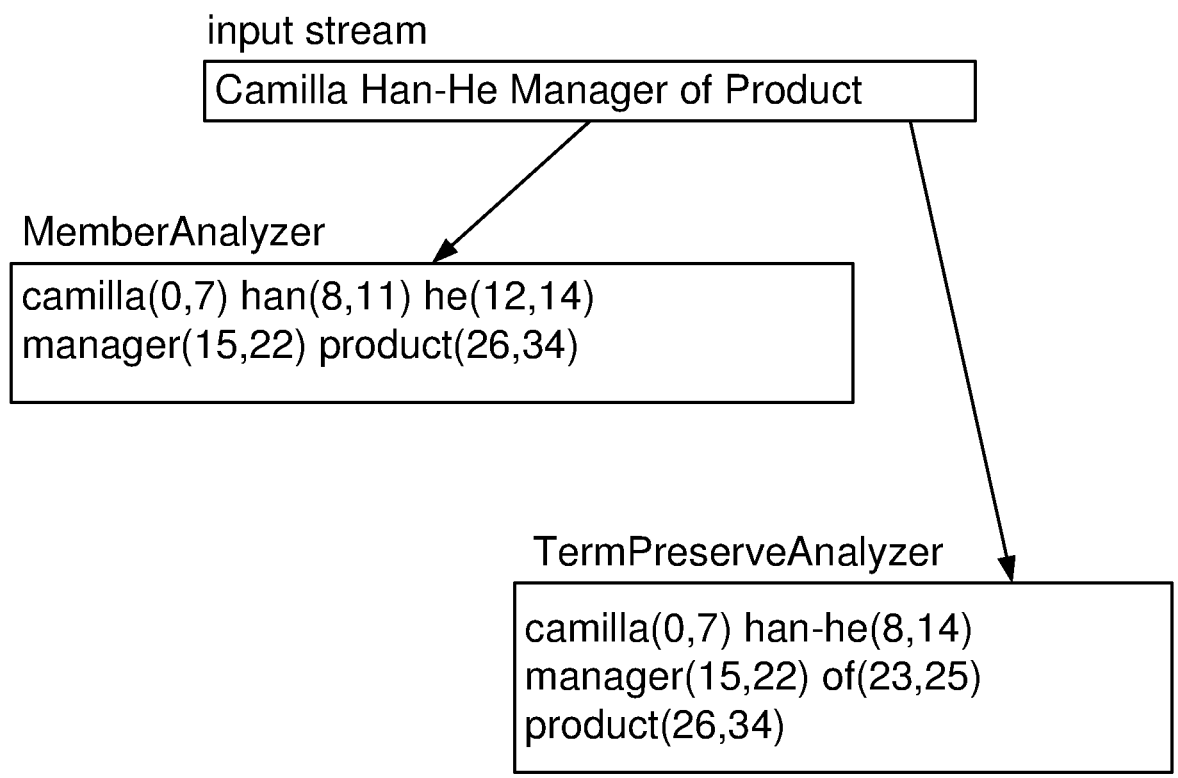
FIG. 9 illustrates the use of the differential algorithm, according to some example embodiments.

FIG. 9 illustrates the use of the differential algorithm, according to some example embodiments. In some example embodiments, the differential analyzer also records the position of the tokens within the input stream. This way, it is possible to identify if two tokens in the variant default and the variant original differential are from the same token in the input stream by comparing their offsets.

In the illustrated example, the input stream is "Camilla Han-He Manager of Product." For each token, the member analyzer records the beginning and ending character of the token within the input stream. In this example, the member analyzer would generate tokens camilla(0,7), han(8,11), he(12,14), manager(15,22), and product(26,34). This means that "han" token begins at character 8 and ends at character 11 of the input stream.

The term preserve analyzer also records the positions of the tokens in the variant original differential, in this case, camilla(0,7), han-he(8,14), manager(15,22), of(23,25), and product(26,34). During the search, a check is made to determine if the tokens are in the same offset range.

For "camilla," it would be in both the member analyzer and the term preserve analyzer. However, "han-he" is not equal to either "han" or "he," so the output would be "han-he(addition) han(removal) he(removal)."

Figure 10:
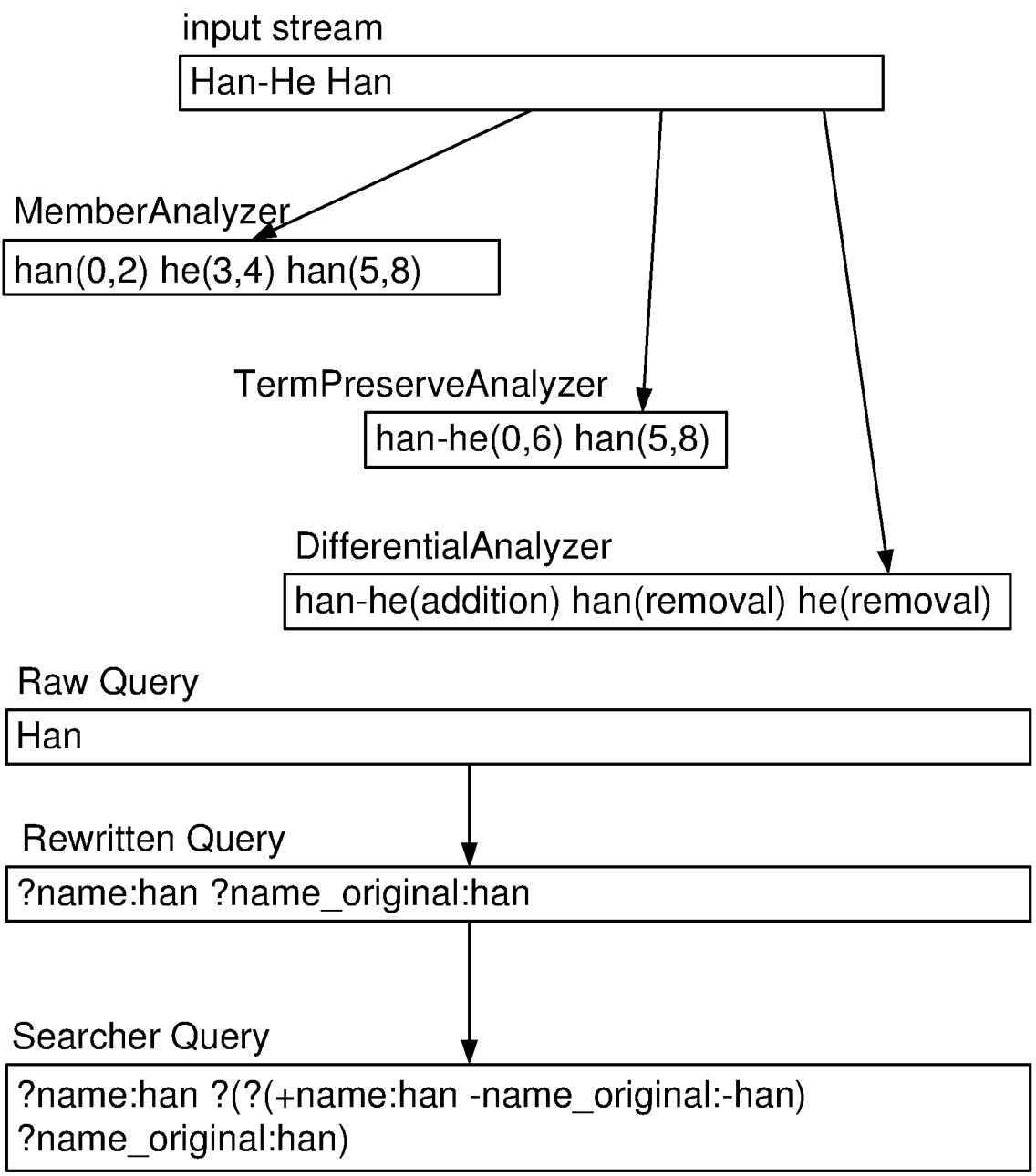
FIG. 10 illustrates the use of tokens with the use of removal and addition attributes, according to some example embodiments.

FIG. 10 illustrates the use of tokens with the use of removal and addition attributes, according to some example embodiments. FIG. 10 shows a special case where a token can have removal and addition attributes at the same time, such as for an input stream of "Han-He Han," where "han" exists as a token that is part of a hyphenated word and as an individual independent token.

Thus, the input stream is "Han-He Han." The member analyzer generates tokens "han(0,2)," "he(3,4)," and "han (5,8)." Further, the term preserve analyzer generates tokens "han-he(0,6)" and "han(5,8)." The differential analyzer generates tokens "han-he(addition)," "han(removal)," and "he (removal)."

If the query "Han" is received, then the rewritten query is:
?name:han ?name_original:han
The searcher then transforms the query to:
?name:han ?(?(+name:han –name_original:-han)
  ?name_original:han)

Figure 11:
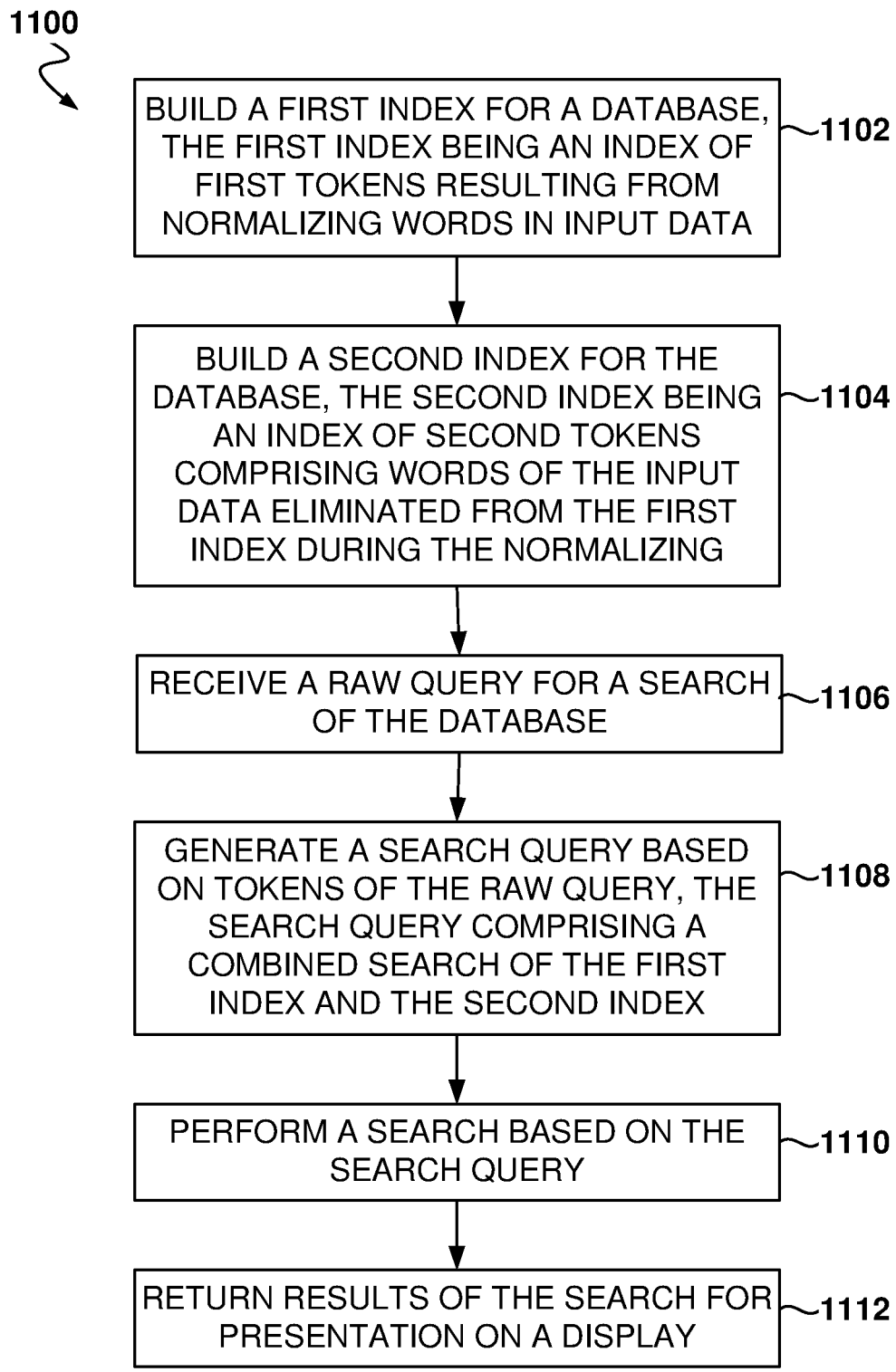
FIG. 11 is a flowchart of a method for improving search speed and quality using differential indexing, according to some example embodiments.

FIG. 11 is a flowchart of a method 1100 for improving search speed and quality using differential indexing, according to some example embodiments. While the various operations in this flowchart are presented and described sequentially, one of ordinary skill will appreciate that some or all of the operations may be executed in a different order, be combined or omitted, or be executed in parallel.

Operation 1102 is for building, by one or more processors, a first index for a database, the first index being an index of first tokens resulting from normalizing words in input data.

From operation 1102, the method 1100 flows to operation 1104, where the one or more processors build a second index for the database. The second index is an index of second tokens comprising words of the input data eliminated from the first index during the normalizing.

From operation 1104, the method 1100 flows to operation 1106 for receiving, by the one or more processors, a raw query for a search of the database.

From operation 1106, the method 1100 flows to operation 1108, where the one or more processors generate a search query based on tokens of the raw query, the search query comprising a combined search of the first index and the second index.

At operation 1110, the one or more processors perform a search based on the search query, and at operation 1112 the results of the search are returned for presentation on a display.

In one example, normalizing words in the input data comprises lowercasing the input data, eliminating filler words, separating hyphenated words in the input data into separate words, and assigning, after the separating, each word of the input data one of the first tokens.

In one example, wherein building the second index comprises assigning to the second tokens the eliminated filler words and the hyphenated words.

In one example, the method 1100 further comprises receiving a new raw query with a hyphenated word, and creating a rewritten query for the new raw query to search tokens of the hyphenated word in the first index and the hyphenated word in the second index.

In one example, building the second index includes adding, to the second tokens, hyphenated words of the input data; and adding, to the second tokens, tokens of the hyphenated words marked as exclusions.

In one example, the method 1100 further comprises receiving a single-word raw query with one word, and creating a rewritten query for the single-word raw query to search the first index for tokens of the one word and either: search the one word in the second index; or search one word in the first index and search exclusions of the tokens of the one word in the second index.

In one example, a member analyzer generates the first index with an indication of a position of the first tokens in the input data.

In one example, a term preserve analyzer generates the second index with an indication of a position of the second tokens in the input data.

Another general aspect is for a system that includes a memory comprising instructions and one or more computer processors. The instructions, when executed by the one or more computer processors, cause the one or more computer processors to perform operations comprising: building a first index for a database, the first index being for first tokens resulting from normalizing words in input data; building a second index for the database, the second index being for second tokens comprising words of the input data eliminated from the first index during the normalizing; receiving a raw query for a search of the database; generating a search query based on tokens of the raw query, the search query comprising a combined search of the first index and the second index; performing a search based on the search query; and returning results of the search for presentation on a display.

In yet another general aspect, a machine-readable storage medium (e.g., a non-transitory storage medium) includes instructions that, when executed by a machine, cause the machine to perform operations comprising: building a first index for a database, the first index being for first tokens resulting from normalizing words in input data; building a second index for the database, the second index being for second tokens comprising words of the input data eliminated from the first index during the normalizing; receiving a raw query for a search of the database; generating a search query based on tokens of the raw query, the search query comprising a combined search of the first index and the second index; performing a search based on the search query; and returning results of the search for presentation on a display.

Figure 12:
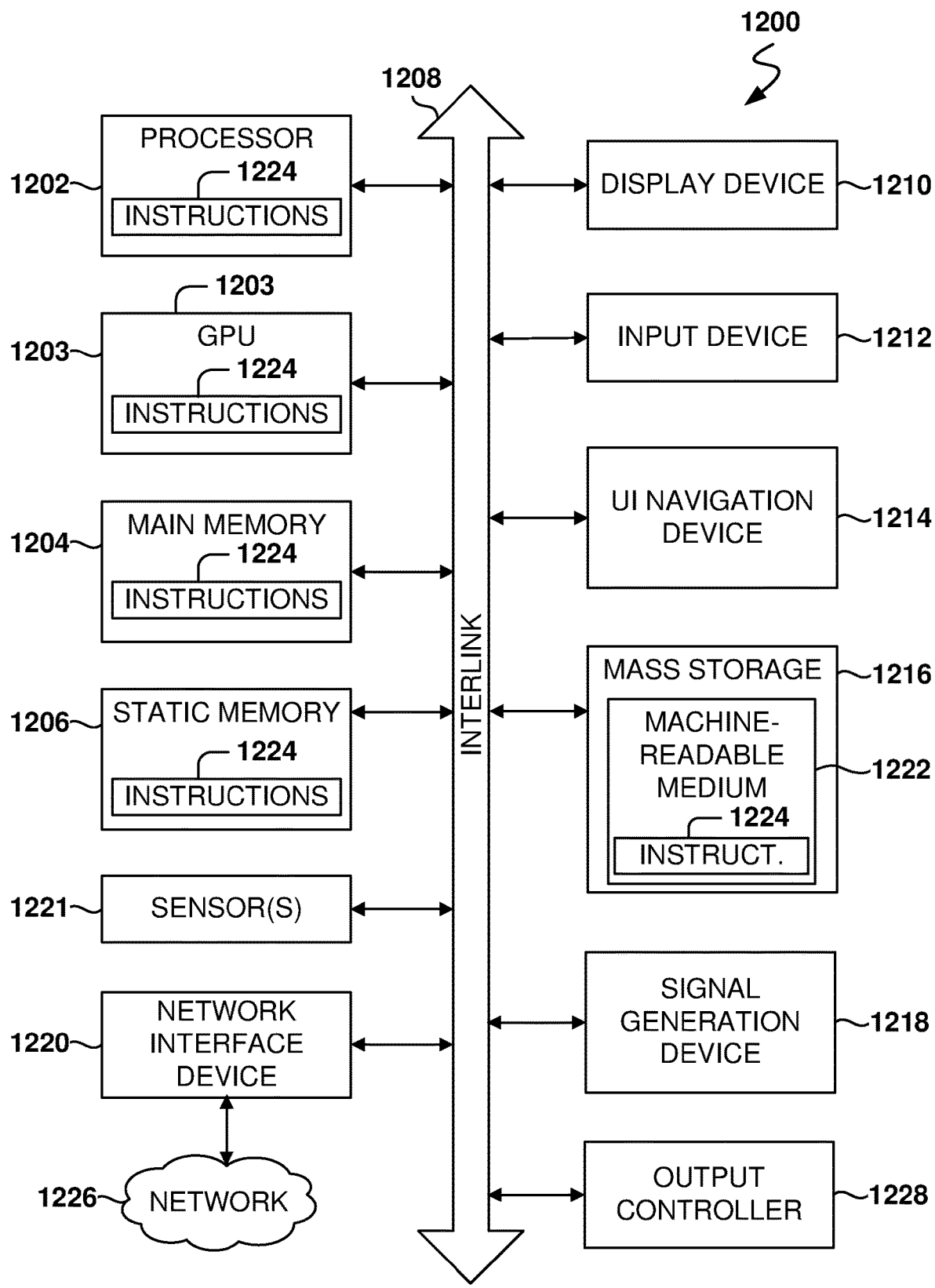
FIG. 12 is a block diagram illustrating an example of a machine upon or by which one or more example process embodiments described herein may be implemented or controlled.

FIG. 12 is a block diagram illustrating an example of a machine 1200 upon or by which one or more example process embodiments described herein may be implemented or controlled. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in a peer-to-peer (P2P) (or other distributed) network environment. Further, while only a single machine 1200 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1200 may include a hardware processor 1202 (e.g., a central processing unit (CPU), a hardware processor core, or any combination thereof), a graphics processing unit (GPU) 1203, a main memory 1204, and a static memory 1206, some or all of which may communicate with each other via an interlink (e.g., bus) 1208. The machine 1200 may further include a display device 1210, an alphanumeric input device 1212 (e.g., a keyboard), and a user interface (UI) navigation device 1214 (e.g., a mouse). In an example, the display device 1210, alphanumeric input device 1212, and UI navigation device 1214 may be a touch screen display. The machine 1200 may additionally include a mass storage device (e.g., drive unit) 1216, a signal generation device 1218 (e.g., a speaker), a network interface device 1220, and one or more sensors 1221, such as a Global Positioning System (GPS) sensor, compass, accelerometer, or another sensor. The machine 1200 may include an output controller 1228, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1216 may include a machine-readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, within the hardware processor 1202, or within the GPU 1203 during execution thereof by the machine 1200. In an example, one or any combination of the hardware processor 1202, the GPU 1203, the main memory 1204, the static memory 1206, or the mass storage device 1216 may constitute machine-readable media.

While the machine-readable medium 1222 is illustrated as a single medium, the term "machine-readable medium" may include a single medium, or multiple media, (e.g., a centralized or distributed database, and/or associated caches and servers) configured to store the one or more instructions 1224.

The term "machine-readable medium" may include any medium that is capable of storing, encoding, or carrying instructions 1224 for execution by the machine 1200 and that cause the machine 1200 to perform any one or more of the techniques of the present disclosure, or that is capable of storing, encoding, or carrying data structures used by or associated with such instructions 1224. Non-limiting machine-readable medium examples may include solid-state memories, and optical and magnetic media. In an example, a massed machine-readable medium comprises a machine-readable medium 1222 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   building, by one or more processors, a first index for a database, the first index being an index of first tokens resulting from normalizing words in input data;
   building, by the one or more processors, a second index for the database, the second index being an index of second tokens comprising words of the input data eliminated from the first index during the normalizing;
   receiving, by the one or more processors, a raw query for a search of the database;
   generating, by the one or more processors, a search query based on tokens of the raw query, the search query comprising a combined search of the first index and the second index;
   performing, by the one or more processors, a search based on the search query; and
   returning results of the search for presentation on a display.

2. The method as recited in claim 1, wherein normalizing words in the input data comprises:
   lowercasing the input data;
   eliminating filler words;
   separating hyphenated words in the input data into separate words; and
   assigning, after the separating, each word of the input data to one of the first tokens.

3. The method as recited in claim 2, wherein building the second index comprises:
   assigning to the second tokens the eliminated filler words and the hyphenated words.

4. The method as recited in claim 3, further comprising:
   receiving a new raw query with a hyphenated word; and
   creating a rewritten query for the new raw query to search tokens of the hyphenated word in the first index and the hyphenated word in the second index.

5. The method as recited in claim 1, wherein building the second index includes:
   adding, to the second tokens, hyphenated words of the input data; and
   adding, to the second tokens, tokens of the hyphenated words marked as exclusions.

6. The method as recited in claim 5, further comprising:
   receiving a single-word raw query with one word; and
   creating a rewritten query for the single-word raw query to search the first index for tokens of the one word and either:
      search the one word in the second index; or
      search one word in the first index and search exclusions of the tokens of the one word in the second index.

7. The method as recited in claim 1, wherein a member analyzer generates the first index with an indication of a position of the first tokens in the input data.

8. The method as recited in claim 1, wherein a term preserve analyzer generates the second index with an indication of a position of the second tokens in the input data.

9. A system comprising:
a memory comprising instructions; and
one or more computer processors, wherein the instructions, when executed by the one or more computer processors, cause the system to perform operations comprising:
building a first index for a database, the first index being an index of first tokens resulting from normalizing words in input data;
building a second index for the database, the second index being an index of second tokens comprising words of the input data eliminated from the first index during the normalizing;
receiving a raw query for a search of the database;
generating a search query based on tokens of the raw query, the search query comprising a combined search of the first index and the second index;
performing a search based on the search query; and
returning results of the search for presentation on a display.

10. The system as recited in claim 9, wherein normalizing words in the input data comprises:
lowercasing the input data;
eliminating filler words;
separating hyphenated words in the input data into separate words; and
assigning, after the separating, each word of the input data to one of the first tokens.

11. The system as recited in claim 10, wherein building the second index comprises:
assigning to the second tokens the eliminated filler words and the hyphenated words.

12. The system as recited in claim 11, wherein the instructions further cause the one or more computer processors to perform operations comprising:
receiving a new raw query with a hyphenated word; and
creating a rewritten query for the new raw query to search tokens of the hyphenated word in the first index and the hyphenated word in the second index.

13. The system as recited in claim 9, wherein building the second index includes:
adding, to the second tokens, hyphenated words of the input data; and
adding, to the second tokens, tokens of the hyphenated words marked as exclusions.

14. The system as recited in claim 13, wherein the instructions further cause the one or more computer processors to perform operations comprising:
receiving a single-word raw query with one word; and
creating a rewritten query for the single-word raw query to search the first index for tokens of the one word and either:
search the one word in the second index; or
search one word in the first index and search exclusions of the tokens of the one word in the second index.

15. The system as recited in claim 9, wherein a member analyzer generates the first index with an indication of a position of the first tokens in the input data.

16. The system as recited in claim 9, wherein a term preserve analyzer generates the second index with an indication of a position of the second tokens in the input data.

17. The system as recited in claim 9, wherein the instructions further cause the one or more computer processors to perform operations comprising:
for each first token of the first index, recording a beginning position and an ending position of the first token within the input data.

18. The system as recited in claim 17, wherein the instructions further cause the one or more computer processors to perform operations comprising:
for each second token of the second index, recording a beginning position and an ending position of the second token within the input data.

19. A non-transitory machine-readable storage medium including instructions that, when executed by a machine, cause the machine to perform operations comprising:
building a first index for a database, the first index being an index of first tokens resulting from normalizing words in input data;
building a second index for the database, the second index being an index of second tokens comprising words of the input data eliminated from the first index during the normalizing;
receiving a raw query for a search of the database;
generating a search query based on tokens of the raw query, the search query comprising a combined search of the first index and the second index;
performing a search based on the search query; and
returning results of the search for presentation on a display.

20. The non-transitory machine-readable storage medium as recited in claim 19, wherein normalizing words in the input data comprises:
lowercasing the input data;
eliminating filler words;
separating hyphenated words in the input data into separate words; and
assigning, after the separating, each word of the input data to one of the first tokens.

* * * * *